Figure 1:
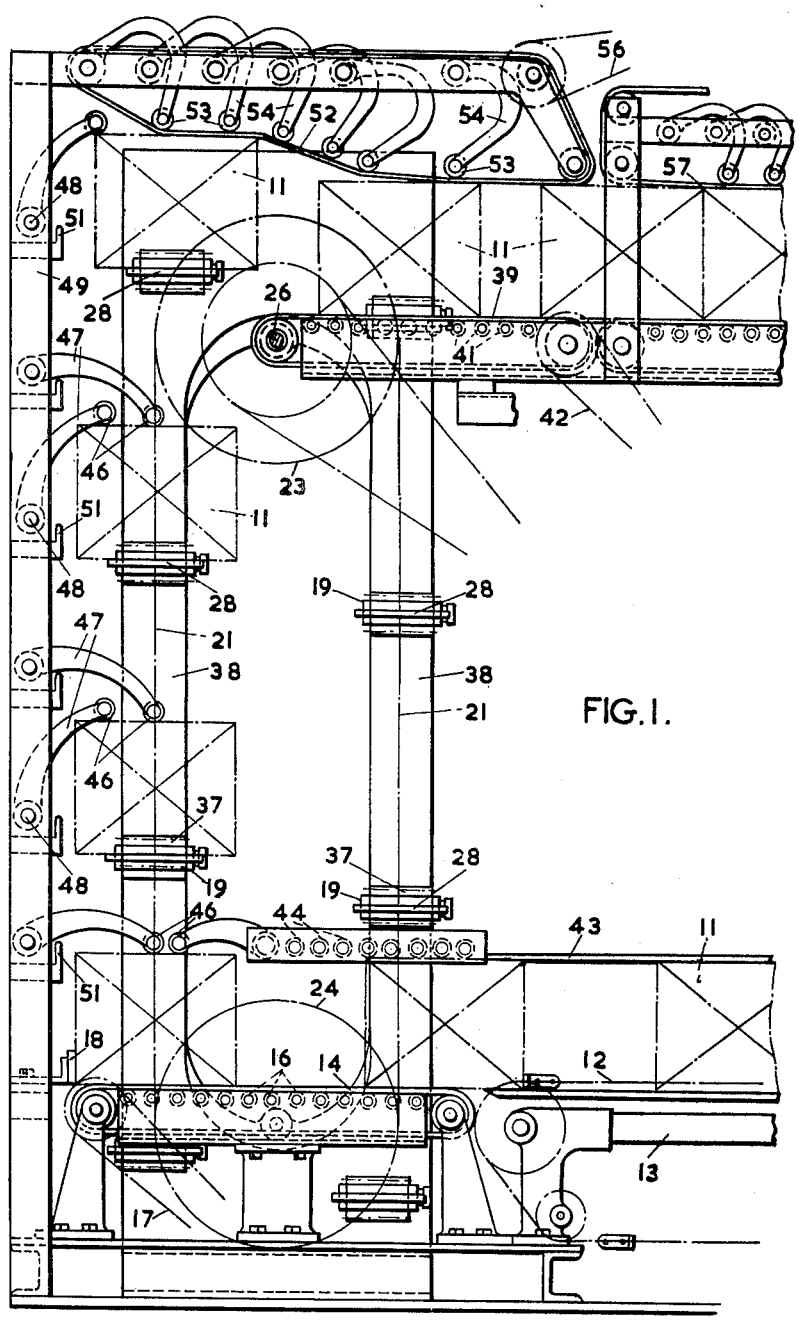

Dec. 21, 1965  J. A. KAY  3,224,564
CONVEYING APPARATUS

Filed Jan. 27, 1964  3 Sheets-Sheet 1

Dec. 21, 1965   J. A. KAY   3,224,564
CONVEYING APPARATUS
Filed Jan. 27, 1964   3 Sheets-Sheet 3

United States Patent Office 3,224,564
Patented Dec. 21, 1965

3,224,564
CONVEYING APPARATUS
James Arthur Kay, Gainsborough, England, assignor to Rose Brothers (Gainsborough) Limited, Gainsborough, England, a British company
Filed Jan. 27, 1964, Ser. No. 340,310
Claims priority, application Great Britain, Jan. 25, 1963, 3,327/63
3 Claims. (Cl. 198—163)

This invention relates to conveying apparatus of the type used for receiving cardboard cartons or like containers (hereinafter referred to as cartons) in succession from a carton closing and sealing apparatus and conveying them to a delivery station, pressure being exerted upon the freshly sealed flaps, during such conveyance, so as to maintain the closure during the drying of the sealing medium.

When closing and sealing large cartons (e.g., cartons each containing a number of smaller packages) at high speeds, e.g., of the order of 30 cartons per minute or more, the difficulty arises that the time required for the sealing medium to dry is such that a pressure conveyor of substantial length is required, and since the pressure conveyor is normally arranged in line with the closing and sealing apparatus, an undesirable length of floor space is taken up.

An object of the invention is to provide a conveying apparatus in which the above difficulty is alleviated.

According to the present invention, a conveying apparatus of the type referred to comprises an intermediate platform adapted to receive cartons in succession from the closing and sealing apparatus, an endless elevator arranged transversely to the plane of the intermediate platform and provided with a spaced series of carrier members adapted on the upward run of the elevator to move in succession through the plane of the intermediate platform into engagement with the bases of successive cartons received by that platform so as to lift the successive cartons from that platform, and an intermediate conveyor arranged above the level of the intermediate platform and adapted to receive the successive cartons from the carrier members on the downward run of the elevator and to guide them into a pressure conveyor.

The intermediate platform is conveniently constituted by a series of rollers which support the upper lap of an endless belt conveyor, the rollers and belt being somewhat less than the width of the cartons and being arranged intermediate the width of the cartons so as to leave a substantial portion of the base of a carton overhanging the belt as it moves over it. A stop is conveniently provided to engage the successive cartons on the belt conveyors to position them in readiness for the successive oncoming carriers on the elevator.

The intermediate conveyor is similar in construction to the platform conveyor, and similarly engages an intermediate portion of the base of each container delivered to it by the elevator.

The elevator conveniently consists of a pair of parallel endless chains with their driving and supporting sprockets in lateral alignment, the chains being arranged one on each side of the path of movement of the cartons. The carrier members may consist of opposed plates extending inwardly from the chains to points somewhat short of the sides of the platform and intermediate conveyors so as to pass clear of those conveyors, the plates being pivotally mounted on the chain and provided with parallel motion mechanism. To avoid excessive spacing of the cartons as they leave the closing and sealing apparatus, the plates are preferably tiltable in an upward direction.

To avoid the freshly sealed flaps of the containers from springing outwardly as they leave the closing and sealing apparatus, upper guides are provided, the guides preferably extending partially along the platform in the form of a series of pressure rollers. Similarly, along the upper run of the elevator there is preferably arranged a series of rollers carried by pivoted arms, the rollers engaging the upper surfaces of successive cartons as they move upwardly, each roller being arranged to roll along the upper surface and down the side of a carton, as the latter is elevated.

For the same reason, there is preferably provided above the intermediate conveyor an auxiliary pressure conveyor arranged to be engaged by the upper surface of each carton in turn as it moves around the axis of the upper elevator sprockets to be deposited on to the intermediate conveyor.

Figure 2:
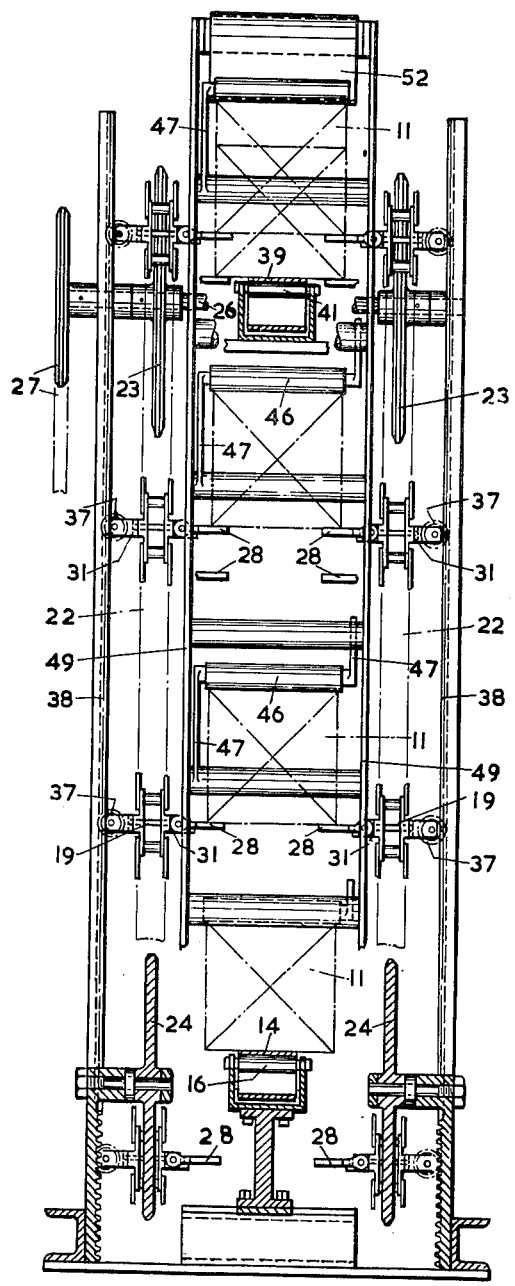
Figure 3:
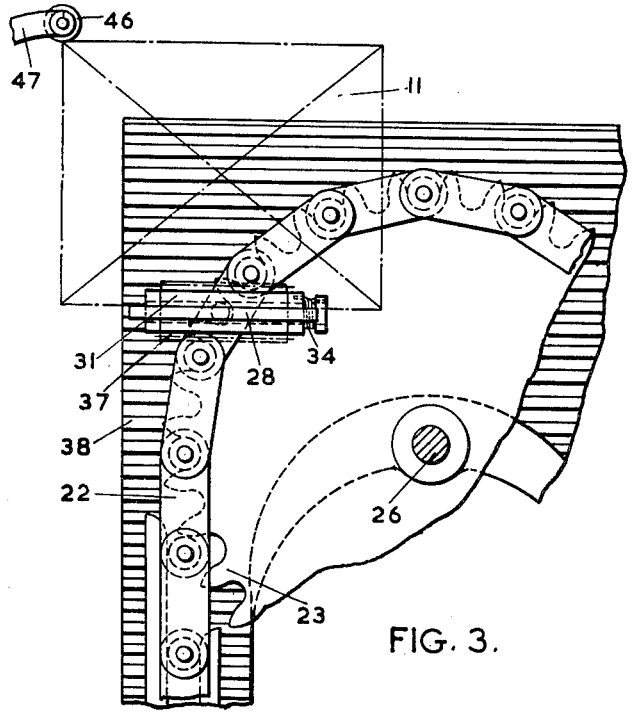
Figure 4:
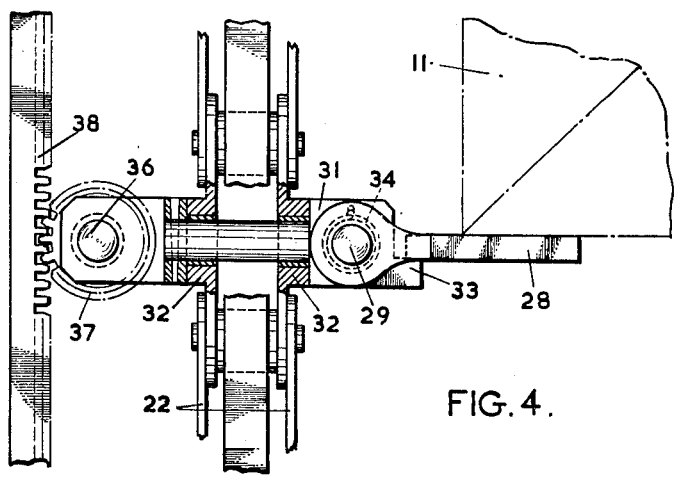

By way of example, the invention will now be described in greater detail with reference to the accompanying drawings in which FIGURE 1 is an elevation of a conveying apparatus for freshly sealed cartons, FIGURE 2 is an end view, partly in section, of the apparatus, FIGURE 3 is a detail of FIGURE 1 drawn to a larger scale and FIGURE 4 is a detail of FIGURE 2 drawn to a larger scale.

Cartons 11 from the delivery conveyor 12 of a carton closing and sealing machine 13 pass in succession on to an intermediate platform in the form of an endless band 14 the upper lap of which is supported on a series of freely mounted rollers 16, the band 14 being driven by belt gearing 17. A stop 18 positions each successive carton 11 in readiness for further transport by successive carrier members, generally referred to by refeence nueral 19, arranged in spaced relationship on an endless elevator 21, the carrier members 19 passing through the plane of the band 14 so as successively to move into elevating position below the successive cartons 11 positioned by the stop 18.

The elevator 21 consists of a pair of parallel endless chains 22 mounted on driving and supporting sprockets 23 and 24, respectively, the chains being arranged one on each side of the path of movement of the cartons 11. The driving sprockets 23 are mounted on a common shaft 26 which is driven by chain and sprocket gearing 27. The carrier members 19 consist of opposed plates 28 extending inwardly from the chains 22 to points somewhat short of the sides of the band 14 so as to pass clear of the band 14 as they pass through the plane of the band 14. The band 14 and its supporting rollers 16 are somewhat less than the width of the cartons 11 so as to leave a substantial portion of the base of each carton overhanging the band 14 as it moves on to it.

The plates 28 and their means of mounting on the chains 22 are identical in construction, each plate 28 being pivotally mounted at 29 in a gudgeon member 31 pivotally mounted in a bearing bracket 32 forming a link in the chain 22, the plate 28 being urged downwardly against a stop 33 by a weak torsion spring 34.

Freely mounted at 36 in the gudgeon member 31 is a pinion 37 arranged in permanent mesh with the teeth of a rack member 38. Such rack and pinion arrangement causes the plates 28 to remain parallel to each other at all times during the movement of the chains 22.

Arranged between the chains 22 near the upper end of the elevator, is an intermediate conveyor, similar in construction to the platform conveyor 14, consisting of an endless band 39 the upper lap of which is supported on a series of freely mounted rollers 41, the band being driven by belt gearing 42.

Guides 43 maintain the upper flaps of the cartons in closed position as they pass on to the platform conveyor 14 the guides terminating in a series of freely mounted rollers 44. For the same purpose, there is arranged along the upper run of the elevator a series of rollers 46 each freely mounted in an arm 47 pivotally mounted at 48 on the framework 49 of the apparatus, stops 51 determining the extent of the free downward movement.

An auxiliary pressure conveyor band 52 is arranged above the intermediate conveyor band 14, the auxiliary conveyor band 52 having a series of automatically adjustable pressure rollers 53 each freely mounted in an arm 54 pivoted on the framework 49, the arms being disposed alternately at opposite sides of the band 52. The band 52 is driven by belt gearing 56 through a spring-loaded ratchet mechanism allowing the linear speed of the band 52 to vary as required. Such automatically adjustable pressure conveyors are fully described in specification No. 2,254,860.

In operation, each carton 11 is arrested by the stop 18 and while so positioned, is engaged by the plates 28 of a carrier member 19 which elevates the carton, and during such movement the rollers 46 roll along the upper surface and down the sides of each carton 11 in turn. At the upward limit of the elevator 21, each carton presses against the rollers 53 of the auxiliary conveyor 52 which maintains the closure during movement of the carton about the axes of the sprockets 23 to be deposited onto the intermediate conveyor 39, the latter and the auxiliary conveyor then passing the carton to a main pressure conveyor 57.

The pivoting of the plates 28 allows them to slide down the sides of any carton that should be in their path of movement on the downward run of the elevator.

I claim:

1. A conveying apparatus of the type referred to, comprising an intermediate platform adapted to receive cartons in succession from the closing and sealing apparatus, an elevator consisting of a pair of parallel endless chains with their driving and supporting sprockets in lateral alignment, the chains being arranged one on each side of the path of movement of the cartons and arranged transversely to the plane of the intermediate platform, a spaced series of carrier members mounted on the elevator and adapted on the upward run of the elevator to move in succession through the plane of the intermediate platform into engagement with the bases of successive cartons received by that platform so as to lift the successive cartons from that platform, the carrier members each consisting of opposed plates extending inwardly from the chains, and being pivotally mounted on the chains and provided with parallel motion mechanism, a stop member adapted to engage the successive cartons on the platform to position them in readiness for the successive oncoming carriers on the elevator, an intermediate conveyor arranged above the level of the intermediate platform and adapted to receive the successive cartons from the carrier members on the downward run of the elevator and to guide them into a pressure conveyor, a series of rollers carried by pivoted arms arranged along the upper run of the elevator, the rollers engaging the upper surface of successive cartons as they move upwardly and each being arranged to roll along the upper surface and down the side of each successive carton as the latter is elevated, and an auxiliary pressure conveyor arranged above the intermediate conveyor and adapted to be engaged by the upper surface of each carton in turn as it moves around the axis of the upper elevator sprockets to be deposited on to the intermediate conveyor.

2. A conveying apparatus of the type referred to, comprising an intermediate platform adapted to receive cartons in succession from the closing and sealing apparatus, an elevator consisting of a pair of parallel endless chains with their driving and supporting sprockets in lateral alignment, the chains being arranged one on each side of the path of movement of the cartons and arranged transversely to the plane of the intermediate platform, a spaced series of carrier members pivotally mounted on the elevator and provided with parallel motion mechanism, the carrier members each being provided with a pair of opposed plates extending inwardly from the chains, said plates being pivotally mounted on the carrier members so as to be tiltable in an upward direction, a stop member adapted to engage the successive cartons on the platform to position them in readiness for the successive oncoming carriers on the elevator, an intermediate conveyor arranged above the level of the intermediate platform and adapted to receive the successive cartons from the carrier members on the downward run of the elevator and to guide them into a pressure conveyor, a series of rollers carried by pivoted arms arranged along the upper run of the elevator, the rollers being arranged to roll along the upper surface and down the side of each successive carton as it is elevated, and an auxiliary pressure conveyor arranged above the intermediate conveyor and adapted to be engaged by the upper surface of each carton in turn as it moves around the axis of the upper elevator sprockets to be deposited on to the intermediate conveyor.

3. A conveying apparatus of the type referred to, comprising an intermediate platform adapted to receive cartons in succession from the closing and sealing apparatus, an endless elevator arranged transversely to the plane of the intermediate platform and provided with a spaced series of carrier members adapted on the upward run of the elevator to move in succession through the plane of the intermediate platform into engagement with the bases of successive cartons received by that platform so as to lift the successive cartons from that platform, an intermediate conveyor arranged above the level of the intermediate platform and adapted to receive the successive cartons from the carrier members on the downward run of the elevator and to guide them into a pressure conveyor, a series of rollers carried by pivoted arms arranged along the upper run of the elevator, the rollers being arranged to roll along the upper surface and down the side of each successive carton as the latter is elevated.

References Cited by the Examiner

UNITED STATES PATENTS

| 2,254,860 | 8/1941 | Rose | 198—165 |
| 3,129,826 | 4/1964 | Rohrback | 198—163 |

FOREIGN PATENTS

| 499,376 | 3/1951 | Belgium. |

SAMUEL F. COLEMAN, *Primary Examiner.*

RICHARD E. AEGERTER, *Examiner.*